(12) United States Patent
Bleznak et al.

(10) Patent No.: US 11,386,493 B2
(45) Date of Patent: Jul. 12, 2022

(54) SYSTEM AND METHOD FOR CRYPTOCURRENCY TRADING

(71) Applicant: Toffee Merger Sub II, LLC, San Francisco, CA (US)

(72) Inventors: David Bleznak, Birmingham, MI (US);
Sergey Tsyba, Birmingham, MI (US);
Jordan Lyall, Birmingham, MI (US);
Noah Passalacqua, Birmingham, MI (US); Nate Welch, Birmingham, MI (US); Craig Braun, Birmingham, MI (US); Ed Posnak, Birmingham, MI (US); Eric Bujold, Birmingham, MI (US); Colleen Stabler, Birmingham, MI (US); Svenn Mahle, Birmingham, MI (US); Katie Horne, Birmingham, MI (US); Austin Roberts, Birmingham, MI (US); Chris Behar, Birmingham, MI (US); Andrew Trudel, Birmingham, MI (US); Andrew Katsevich, Birmingham, MI (US); Harry Wright, Birmingham, MI (US); Audrey Sciortino, Birmingham, MI (US)

(73) Assignee: Toffee Merger Sub II, LLC, San Francisco, CA (US)

( * ) Notice: Subject to any disclaimer, the term of this patent is extended or adjusted under 35 U.S.C. 154(b) by 340 days.

(21) Appl. No.: 16/510,918

(22) Filed: Jul. 14, 2019

(65) Prior Publication Data

US 2020/0020032 A1    Jan. 16, 2020

Related U.S. Application Data

(60) Provisional application No. 62/697,442, filed on Jul. 13, 2018.

(51) Int. Cl.
*G06Q 40/00* (2012.01)
*G06Q 40/04* (2012.01)
*G06Q 20/36* (2012.01)

(52) U.S. Cl.
CPC ......... *G06Q 40/04* (2013.01); *G06Q 20/3678* (2013.01); *G06Q 2220/00* (2013.01)

(58) Field of Classification Search
None
See application file for complete search history.

(56) References Cited

U.S. PATENT DOCUMENTS

2017/0287068 A1* 10/2017 Nugent ............... G06Q 20/065
2018/0082390 A1*  3/2018 Leidner ............... G06Q 50/18
2018/0183600 A1*  6/2018 Davis ................. G06F 16/951
2021/0082045 A1*  3/2021 Assia ................. G06F 16/2379

* cited by examiner

*Primary Examiner* — Olabode Akintola
(74) *Attorney, Agent, or Firm* — Perkins Coie LLP

(57) ABSTRACT

A system and method that relies upon smart contracts to facilitate cryptocurrency trades through a plurality of different exchanges. The system and method preferably operate on the blockchain.

20 Claims, 13 Drawing Sheets

SYSTEM AND METHOD FOR CRYPTOCURRENCY TRADING

FIELD OF THE INVENTION

The present invention, in at least some embodiments, is of a system and method for cryptocurrency trading and in particular, of such a system and method that relies upon smart contracts to facilitate cryptocurrency trades through a plurality of different exchanges.

BACKGROUND OF THE INVENTION

The cryptoasset industry has undergone rapid expansion in only a few years. Aided by bitcoin's exponential increase in price, the industry began to attract the attention of mainstream investors. As bitcoin's popularity grew, the Ethereum Network entered the scene and revolutionized the cryptoasset industry. By serving as a platform for creating tokens on top of an existing blockchain, Ethereum laid the groundwork for an explosion of cryptoassets—each attacking a space long overdue for disruption or creating entirely new markets. As of March 2018, the total market cap for all cryptoassets exceeded $315 billion.

However, the development of cryptocurrency markets has not been without growing pains. As interest has ramped up and the number of tokens has exploded, the technology needed to trade these assets has struggled to keep up. Thousands of different tokens still need a way to be exchanged, and the current solutions are inadequate.

One significant problem is that cryptocurrencies need a new solution for secondary markets. Right now, coins and tokens are almost exclusively traded on centralized exchanges. Centralized exchanges have served an important role in the cryptocurrency industry by providing a secondary market for coins and tokens. These platforms have enabled secondary markets to achieve significant trading volumes for certain cryptocurrencies. Nevertheless, as the market expands and becomes more complex, the shortcomings of these platforms are becoming more apparent. These shortcomings can be divided into several categories: lack of security, unpredictable trading volume, and poor usability. Centralized exchanges have increasingly faced threats from hackers. In September 2017, Fortune estimated that, since 2011, at least three dozen heists had targeted exchanges. In January 2018, the Japanese crypto exchange provider Coincheck saw hackers make off with a total of $530 million, the largest cryptocurrency hack so far. An August 2017 Forbes article noted that "centralized exchanges, like Coinbase, Kraken, and ShapeShift, carry the risk of theft because they require users to put their money in the hands of a third party." These hacks demonstrate the vulnerabilities that centralized organizations and custodians inevitably contain. The chaos does not end there—DDoS attacks can interrupt market activity, preventing traders from completing potentially critical trades. These are unacceptable security risks for cryptocurrency investors who wish to build a diverse portfolio.

Users of centralized exchanges must also protect their identities from these security risks. Centralized exchanges often request burdensome amounts of personal data, which can be exposed by hackers. Data collected by centralized exchanges can include passport, driver's license, and bank statement images as well as information on place of birth, date of birth, gender, and personal address. With such a significant amount of personal information stored by centralized platforms, users are at risk of not only losing their funds but may also have their identities stolen.

Even if security is not an issue, crypto traders are well aware of the difficulty of fair price discovery in these nascent crypto markets. Therefore, before the global economy can conduct a significant number of its transactions via cryptocurrency markets, the problem of low trading volumes must be addressed. In order for assets to be bought and sold at stable prices, trading must occur at sufficient volumes. When trading volume is low, large orders can have a dramatic impact on price. High-volume markets, on the other hand, can absorb large orders without provoking extreme changes in price. In addition, in a high-volume market, orders can remain open for longer periods of time, contributing to stability and more accurate price discovery.

Compared to traditional markets, crypto markets are thinly traded. This problem is exacerbated by the fact that, from the start, cryptocurrencies have been traded on a 24-hour basis. Since markets are open all the time, there is no period during which buyers and sellers queue up, waiting for the opening bell. Furthermore, order book fragmentation is the current norm, not the exception. A quick perusal of CoinMarketCap shows that, for any given coin, there are enormous spreads in price and volume across dozens of different exchanges.

Worse still, each exchange may only carry the possibility, not the certainty, of a pair trade. For example, a user may have to go to one exchange to buy IOTA with bitcoin and another to buy IOTA with ether. The situation is even more difficult for tokens, and trading tokens directly for other tokens is rare. These structural issues are significant, and unfortunately, they represent only one part of the problem faced by market participants. In addition to the underlying infrastructure, crypto traders and investors must also contend with interfaces that are anything but user friendly.

BRIEF SUMMARY OF THE INVENTION

According to at least some embodiments, the present invention provides a system and method that relies upon smart contracts to facilitate cryptocurrency trades through a plurality of different exchanges. The system and method preferably operate on the blockchain.

According to at least some embodiments, the system and method feature a user interface, which may optionally comprise an app or other downloadable software, a thin client such as a specialized browser or a browser plug-in, or another type of user interface. The interface preferably supports trading by users, although optionally cryptocurrencies (also referred to herein as "coins") may be stored in a separate user wallet. As used herein, the term "cryptocurrency" optionally refers to any suitable type of exchange traded cryptoasset. Preferably, users can track their portfolios and trade ERC20 tokens simply by adjusting a few sliders. Optionally, users can execute complex token trades in a single step.

The system preferably features a technologically agnostic interface through which users can buy and sell tokens directly from their wallets. The system then interacts with decentralized exchanges to allow traders to make the desired trades. The process is more efficient and secure than existing ways of trading since users can initiate trades from their own wallets. As a result, users are no longer obliged to create accounts on multiple exchanges, divulging private information each time.

As new tokens are developed and released, the system will expose these opportunities and make them accessible for trading. At the same time, the agnostic architecture leverages the promise of decentralization by partnering with the most innovative and promising components of the cryptotrading infrastructure—such as relayers, protocols, and various types of blockchains, for example including Ethereum and non-Ethereum blockchains. The end result is access across the cryptoasset landscape, which could potentially allow for a discovery of prices that are more competitive than those offered by centralized exchanges. The system therefore supports a decentralized exchange.

Without wishing to be limited by a closed list, decentralized exchanges have a number of attractive features, an example list of some of which is provided. For example, they make it unnecessary to trust the exchange platform itself, as the funds are held by the user in a personal wallet. Peer-to-peer transactions then take place via an automated process facilitated by smart contracts. These exchanges require stable standards in order for smart contracts to operate seamlessly with other aspects of the technology.

Decentralized exchanges provide greater privacy because personal details are not retained. Each exchange holds only the minimum information it needs to communicate with users and other systems, making it more difficult for bad actors to disrupt the system. The result is that the system as a whole presents a smaller attack surface for hackers. Since funds are stored at the level of the user, individuals are as safe as their own hardware or private key storage mechanism.

The system is preferably implemented with a smart contract-based platform. Users pay a familiar per-trade fee to use the platform. The platform gives crypto investors the ability to easily build a custom portfolio of assets, without requiring a technical understanding of blockchain transactions or cryptoasset administration. Users bring their own keys—they do not have to create wallets on the platform, store private keys, or divulge private information to exchanges that the platform accesses.

Any suitable blockchain which involves a distributed ledger, which preferably requires some type of cryptography, more preferably a public/private key encryption system, or hash or digital signatures, may optionally be used. Once a change—such as acceptance of a contract for a trade—is made and is written to the distributed ledger, this change is automatically securely, non-falsifiably, that is completely accurately, replicated to all network participants.

The nature of the distributed ledger is such that all parties to a transaction can see the details of the transaction and optionally further requirements for the transaction to be complete.

Such a distributed ledger would also have the advantage of fraud prevention with immutable, append-only Distributed Ledger Technology. For example, users attempting to fraudulently trade cryptocurrency units that they do not possess would be blocked.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computing device", a "computer", or "mobile device", it should be noted that optionally any device featuring a data processor and the ability to execute one or more instructions may be described as a computer, including but not limited to any type of personal computer (PC), a server, a distributed server, a virtual server, a cloud computing platform, a cellular telephone, an IP telephone, a smartphone, or a PDA (personal digital assistant). Any two or more of such devices in communication with each other may optionally comprise a "network" or a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings.

DESCRIPTION OF AT LEAST SOME EMBODIMENTS

Figure 1A:
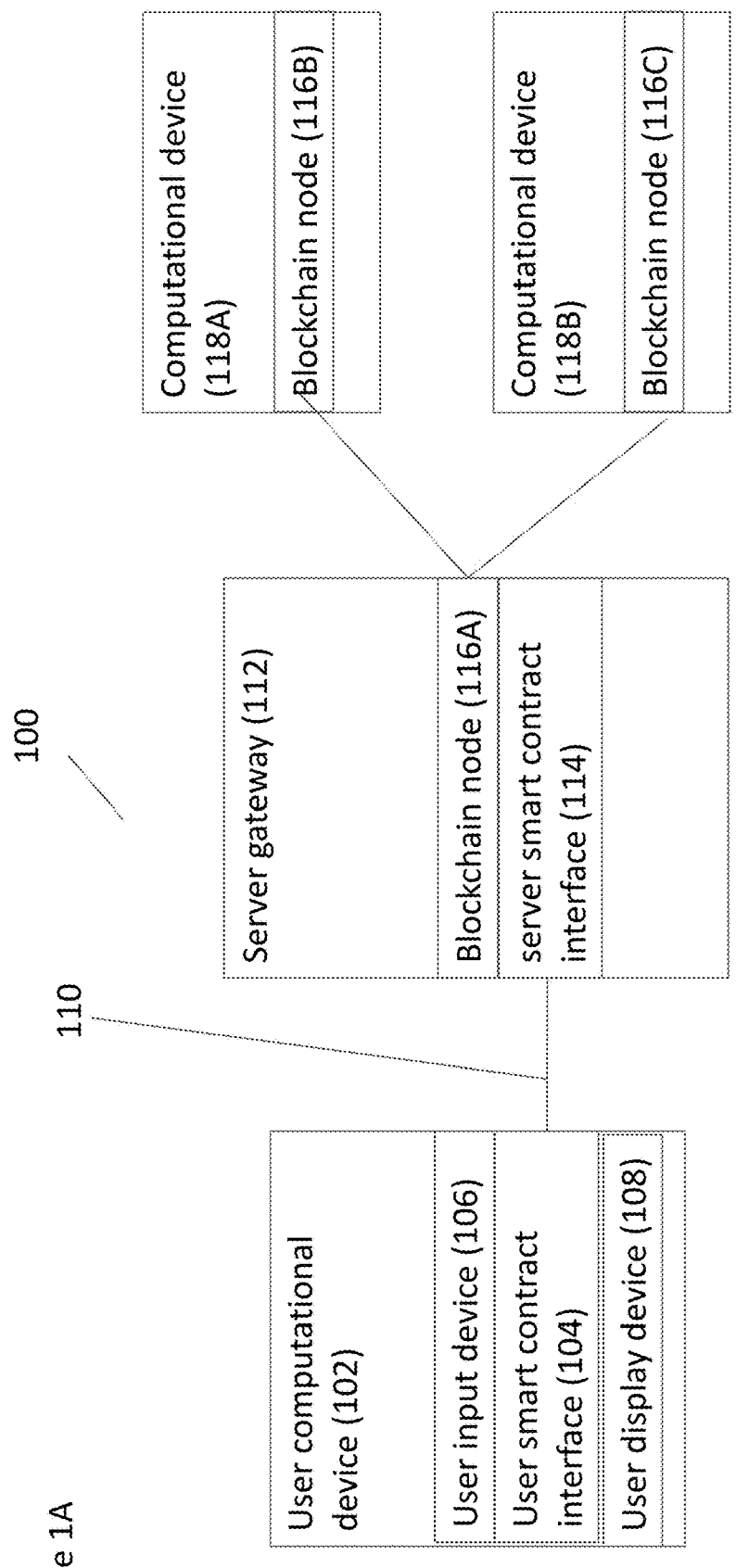
FIGS. 1A-1C show non-limiting, exemplary systems for decentralized trading of cryptoassets according to least some embodiments of the present invention.

The present invention, in at least some embodiments, is of a system and method for distributed exchange and for providing trades through a peer-to-peer, non-centralized system. According to at least some embodiments the blockchain is optionally a public or permissionless blockchain, such as Bitcoin or Ethereum, which is decentralized and which is a blockchain that anyone in the world can read, anyone in the world can send transactions to and expect to see them included if they are valid, and anyone in the world can participate in the consensus process for determining what blocks get added to the chain and what the current state is. As a substitute for centralized or quasi-centralized trust, public or permissionless blockchains are secured by cryptoeconomics—the combination of economic incentives and cryptographic verification using mechanisms such as proof of work or proof of stake, following a general principle that the degree to which someone can have an influence in the consensus process is proportional to the quantity of economic resources that they can bring to bear.

Alternatively and optionally, the blockchain is a consortium blockchain, such as Hyperledger, where the consensus process is controlled by a pre-selected set of nodes, which for example may optionally be financial institutions. Such a blockchain is partially decentralized.

If the blockchain is private or permissioned—that is, centrally controlled by an operating entity to authorize participation—then optionally all members of the system as described by the present invention which need access are provided with cryptographic access, and become members of the private or permissioned blockchain system, such as Hyperledger.

Hyperledger has its own set of protocols and consensus process, which may optionally be used with smart contracts, to prevent fraud.

One of ordinary skill in the art could easily select a distributed ledger and implement it within various embodiments of the present invention, for example according to information provided in "Blockchain Basics: Introduction To Business Ledgers" by Brakeville and Perepa, IBM, May 9, 2016.

A blockchain or blockchain is a distributed database that maintains a list of data records, the security of which is enhanced by the distributed nature of the blockchain. A blockchain typically includes several nodes, which may be one or more systems, machines, computers, databases, data stores or the like operably connected with one another. In some cases, each of the nodes or multiple nodes are maintained by different entities. A blockchain typically works without a central repository or single administrator. One well-known application of a blockchain is the public ledger of transactions for cryptocurrencies such as used in bitcoin. The data records recorded in the blockchain are enforced cryptographically and stored on the nodes of the blockchain.

A blockchain provides numerous advantages over traditional databases. A large number of nodes of a blockchain may reach a consensus regarding the validity of a transaction contained on the transaction ledger. Similarly, when multiple versions of a document or transaction exits on the ledger, multiple nodes can converge on the most up-to-date version of the transaction. For example, in the case of a virtual currency transaction, any node within the blockchain that creates a transaction can determine within a level of certainty whether the transaction can take place and become final by confirming that no conflicting transactions (i.e., the same currency unit has not already been spent) confirmed by the blockchain elsewhere.

The blockchain typically has two primary types of records. The first type is the transaction type, which consists of the actual data stored in the blockchain. The second type is the block type, which are records that confirm when and in what sequence certain transactions became recorded as part of the blockchain. Transactions are created by participants using the blockchain in its normal course of business, for example, when someone sends cryptocurrency to another person), and blocks are created by users known as "miners" who use specialized software/equipment to create blocks. Users of the blockchain create transactions that are passed around to various nodes of the blockchain. A "valid" transaction is one that can be validated based on a set of rules that are defined by the particular system implementing the blockchain. For example, in the case of cryptocurrencies, a valid transaction is one that is digitally signed, spent from a valid digital wallet and, in some cases, that meets other criteria. In some blockchain systems, miners are incentivized to create blocks by a rewards structure that offers a pre-defined per-block reward and/or fees offered within the transactions validated themselves. Thus, when a miner successfully validates a transaction on the blockchain, the miner may receive rewards and/or fees as an incentive to continue creating new blocks.

Preferably the blockchain(s) that is/are implemented are capable of running code, to facilitate the use of smart contracts. Smart contracts are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contracts may also be described as pre-written logic (computer code), stored and replicated on a distributed storage platform (eg a blockchain), executed/run by a network of computers (which may be the same ones running the blockchain), which can result in ledger updates (cryptocurrency payments, etc).

Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

Not all blockchains can execute all types of smart contracts. For example, Bitcoin cannot currently execute smart contracts. Sidechains, i.e. blockchains connected to Bitcoin's main blockchain could enable smart contract functionality: by having different blockchains running in parallel to Bitcoin, with an ability to jump value between Bitcoin's main chain and the side chains, side chains could be used to execute logic. Smart contracts that are supported by sidechains are contemplated as being included within the blockchain enabled smart contracts that are described below.

For all of these examples, security for the blockchain may optionally and preferably be provided through cryptography, such as public/private key, hash function or digital signature, as is known in the art.

Although the below description centers around trading of cryptocurrencies, it is understood that the systems and methods shown herein would be operative to trade any type of cryptoasset on the blockchain.

Turning now to the drawings, as shown in FIG. 1A, there is a system 100 featuring a user computational device 102, which communicates with the server gateway 112 through a computer network 110, such as the internet. User computational device 102 features a processor (not shown) for performing various instructions and commands. As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

User computational device 102 features a user input device 106, which may, for example, comprise a keyboard, mouse, other pointing device, touchscreen, and the like.

User computational device 102 may optionally comprise one or more of a desktop computer, laptop, PC, mobile device, cellular telephone, and the like. User computational device 102 also operates a user smart contract interface 104 and a user display device 108. User display device 108 and user input device 106 may optionally be combined to a touchscreen, for example.

As used herein, a "user interface" 104 generally includes a plurality of interface devices and/or software that allow a customer to input commands and data to direct the processing device to execute instructions. For example, the user interface may include a graphical user interface (GUI) or an interface to input computer-executable instructions that direct the processor to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other customer input/output device for communicating with one or more customers.

User smart contract interface 104 communicates with a server smart contract interface 114 on server gateway 112. This enables user computational device 102 to receive information about cryptocurrency, about trade, about the state of the users, cryptocurrency holdings, and other information with regard to the blockchain. Server gateway 112 also operates a blockchain node 116A. Blockchain node 116A is part of a blockchain. As shown with regard to FIG. 1A, a computational device 118A operates a blockchain node 116B, and a computational device 118B operates a blockchain node 116C. Each such computational device comprises a memory, which is not shown, for storing information regarding the blockchain. In this non-limiting example, blockchain nodes 116A, B, and C belong to a single blockchain, which may be any type of blockchain, as described herein. However, optionally, server gateway 112 may operate with or otherwise be in communication with different blockchains operating according to different protocols.

FIG. 1A shows blockchain nodes 116A, B, and C as communicating, but in fact, in operation of the blockchain, each such computational device retains a complete copy of the blockchain. Optionally, if a blockchain were to be divided, then each computational device could perhaps only retain a portion of the blockchain. With the preferred embodiment described herein, each computational device retains a complete copy of the blockchain. The communication lines are simply shown to indicate that all of the blockchain nodes retain a copy of the blockchain, preferably a complete copy of the blockchain rather than to show communication directly between the computational devices. Optionally, however, server gateway 112 does communicate directly with computational devices 118A and 118B through computer network 110.

In operation of system 100 of FIG. 1A, user computational device 102 may, for example, wish to place an order through user smart contract interface 104, which may, for example, be a web browser plugin, a particular adapted type of web browser, a separate, standalone software, and the like. Upon placing an order for a cryptocurrency, server smart contract interface 114 may then cause one or more smart contracts to be evoked or executed in order for the trade to be performed. Optionally, a server gateway 112 may also be in communication with one or more relayers, such that, for example, computational devices 118A and/or 118B may actually be a relayer, which is able to determine a pool of cryptocurrency of a particular type that is available for purchase for a sale. Then user computational device 102 could indicate that a sale is desired through user smart contract interface 104.

Optionally, server gateway 112 would then cause server smart contract interface 114 to place a hold on or otherwise obtain control of cryptocurrency to verify that, in fact, the user operating user computational device 102 through user smart contract interface 104 actually possessed or owned such cryptocurrency. The sale could then be executed through one or more smart contracts on the blockchain 116.

Figure 1B:
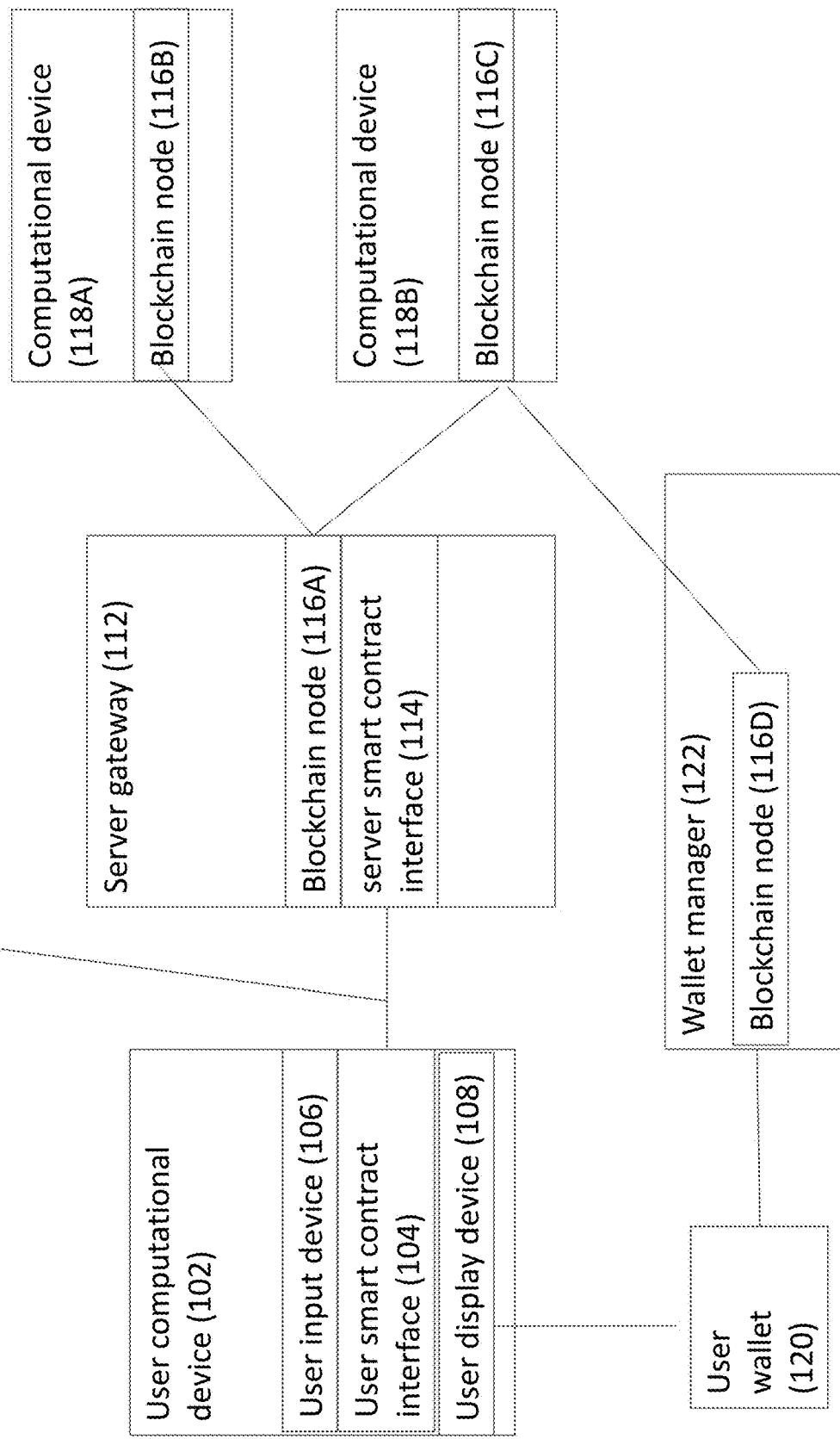

FIG. 1B shows a slightly different configuration, a system 100. This configuration of the system 100, the user computational device 102 is in communication with the user wallet 120. The user wallet 120 is a holding software operated by a computational device or a platform which would hold or possess the cryptocurrencies owned by the user and would store them in a secure manner. User wallet 120 in this example is shown as being managed by wallet manager 122, operating blockchain node 116D. Again, different blockchains would actually be operated for this purchase to occur, but in this case, what is shown is that wallet manager 122 also retains a complete copy of blockchain 116 by operating blockchain node 116D. In this non-limiting example, user wallet 120 may optionally be located on user computational device 102 and may simply be referred to by wallet manager 122 and/or may also be located in an off-site location and, for example, may be located in a server, a server farm, operated by or controlled by a wallet manager 122.

In this non-limiting example, then, server gateway 112 would either verify that the user had the cryptocurrency available for sale in user wallet 120, for example through direct communication with wallet manager 122 either directly, by a computer-to-computer communication, which is not shown, alternatively, by executing a small contract on blockchain 116. If server gateway 112 were to invoke a smart contract for purchase of cryptocurrency, then, again, this could be written onto blockchain 116, such that wallet manager 122 would then know that the user had additional cryptocurrency in the wallet.

Figure 1C:
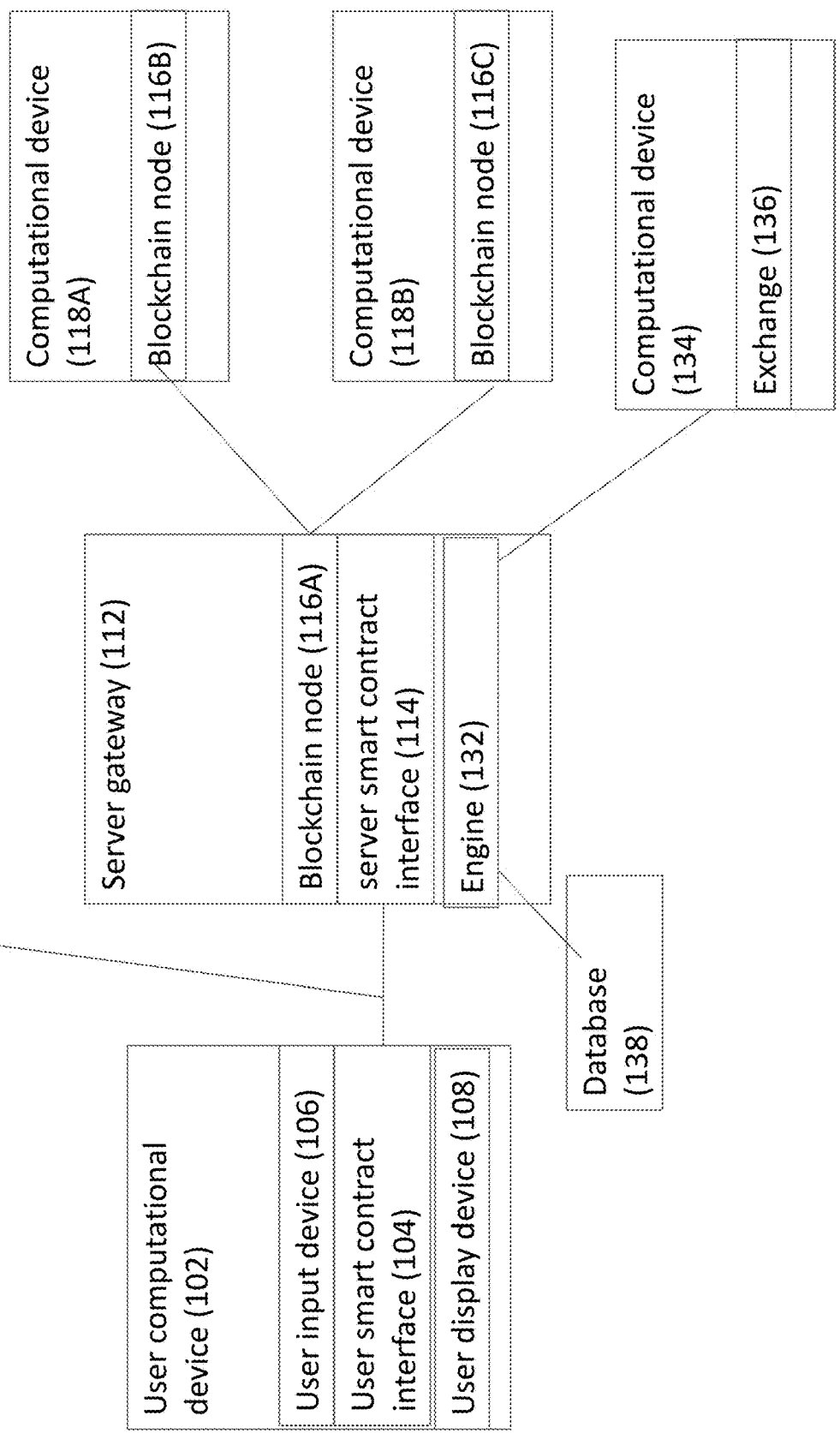

FIG. 1C shows another exemplary system 130, which is similar to the previously described system 100. Components with the same numbers have the same or similar function as for previous Figures. In this non-limiting example system 130, server gateway 112 preferably also operates an engine 132, for obtaining information for provision to user smart contract interface 104. For example, engine 132 may obtain real time quotes for buying or selling cryptocurrencies through a computational device 134, such as an exchange 136 operated by computational device 134, and/or directly through blockchain node 116A. Engine 132 may also provide display information and other instructions to user smart contract interface 104. Engine 132 may also receive instructions from the user, through user smart contract interface 104. Preferably instructions to and from the user, through user smart contract interface 104, are further provided to engine 132 through server smart contract interface 114 as previously described.

Server gateway 112, through engine 132, may also obtain quotes stored in a database 138, which may be periodically updated, for example through communication with exchange 136. Database 138 may also be updated through communication directly with blockchain node 116A or through communication with other types of exchanges, relayers and the like, as described in greater detail below (not shown).

Figure 2:
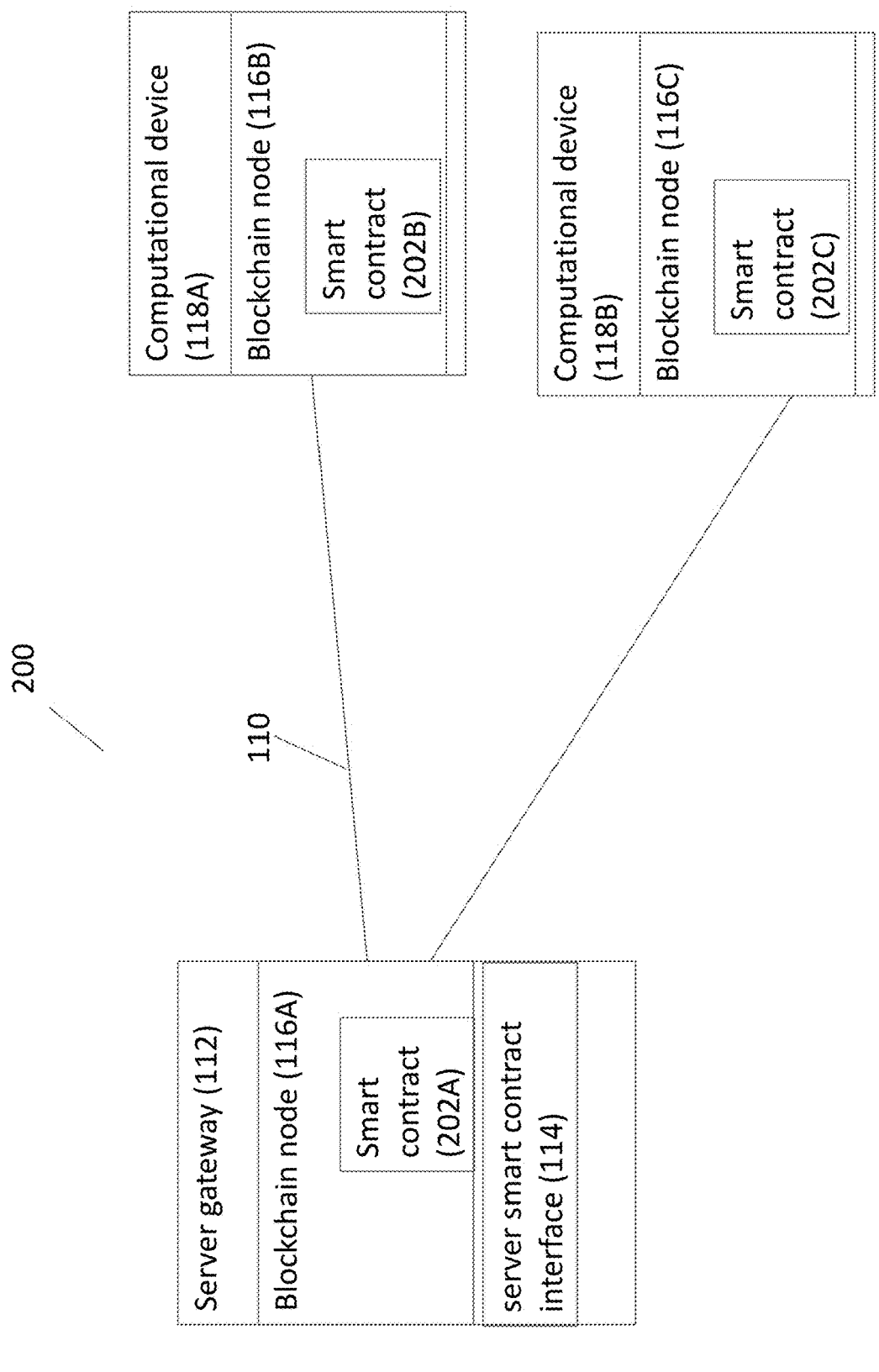
FIG. 2 shows an exemplary system which has been simplified to focus on the smart contracts for the purpose of description only and without any intention of being limiting.

FIG. 2 shows a system 200, which has been simplified to show more detail with regard to the smart contracts. Components with the same reference number as previous figures have the same or similar function. In this non-limiting example, blockchain 116 features a smart contract 202. In this case, each blockchain node also has a copy of the smart contract by having a complete copy of the blockchain or, alternatively, a partial copy of the blockchain, which happens to include the smart contract. Once server gateway 112 seeks to invoke or execute smart contract 202A, then actions may be taken with regard to blockchain nodes 116B and 116C by causing a chain on blockchain 116. For example, server gateway 112 may cause smart contract 202A to execute in order to buy or sell cryptocurrencies of various types.

Figure 3:
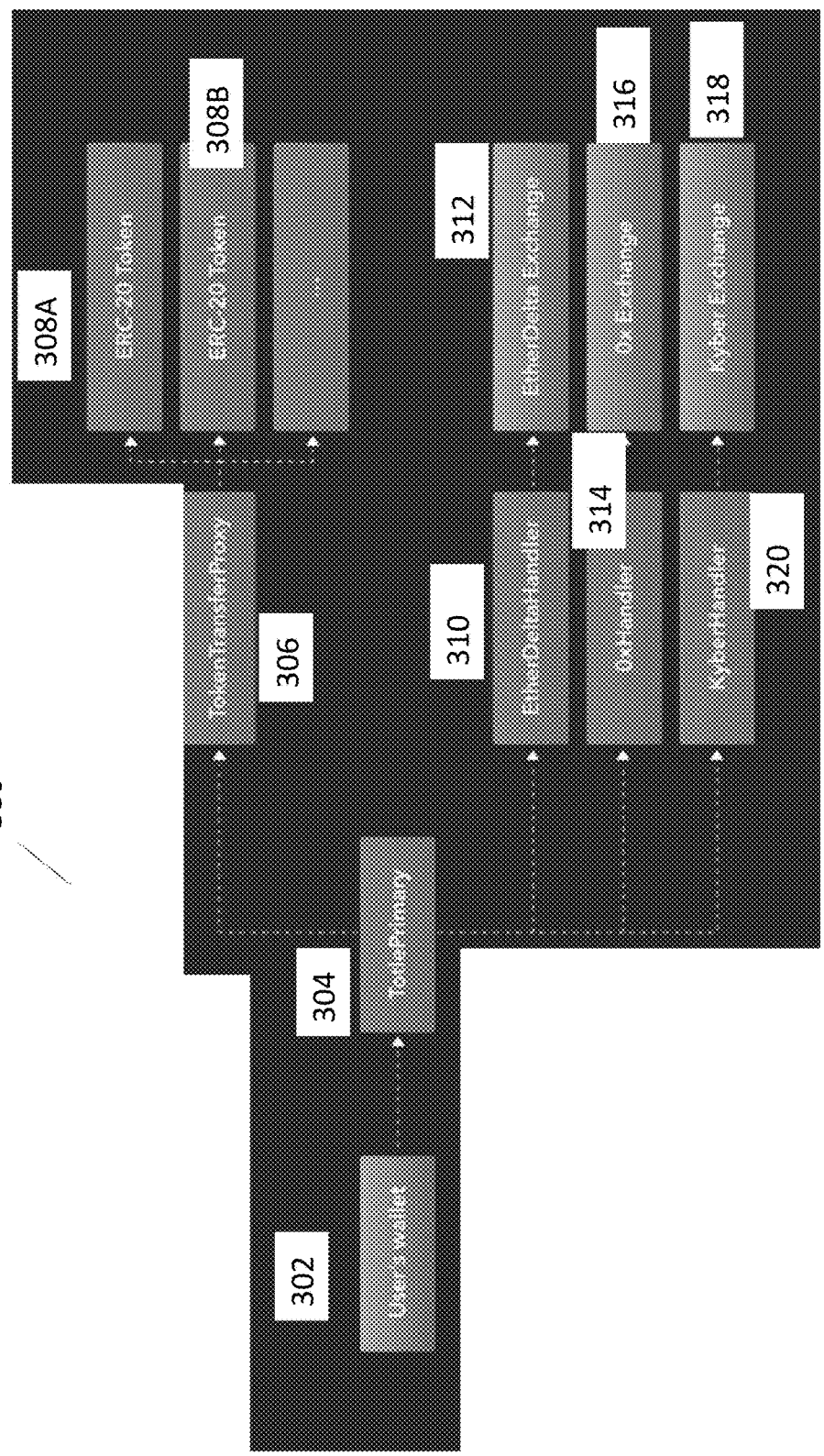
FIG. 3 shows a further non-limiting exemplary system for decentralized trading of cryptoassets according to least some embodiments of the present invention.

FIG. 3 shows a further embodiment of a system 300. In this non-limiting example, the various smart contracts are shown. The smart contracts are code which exist on the blockchain and which are invoked or executed by computational devices (not shown). The blockchain and the computational devices are not shown for ease of explanation only and without wishing to be limited in any way. Preferably the smart contracts support a simple yet secure connection between a user interface, which may for example be a user interface and/or user wallet as described herein, and liquidity in cryptocurrencies available across several decentralized exchanges. Preferably all trades are executed atomically on-chain (that is, through a blockchain transaction), more preferably through a single blockchain transaction, such as a single ethereum transaction for example.

Preferably, the smart contract receives some arbitrary data to be used as the payload for each DEX trade. In addition, the contract also tracks the amounts spent and received, ensuring exchange rates are equal to or better than expected. By "expected" it is meant the exchange rate as provided to the user, for example through the user interface and/or wallet, before the trade is performed.

A user's cryptocurrency wallet 302 sends an instruction to a primary contract 304. Primary contract 304, preferably, is provided by the platform in order to be able to execute orders and to determine whether the user actually has the cryptocurrency which is to be sold, and also to make certain that the cryptocurrency is recorded in the user's wallet upon being bought by the user.

User wallet 302 sends a command to primary contract 304, for example, to buy or sell cryptocurrency. For selling cryptocurrency, optionally primary contract 304 places a hold on the cryptocurrency in user wallet 302, after verifying that user wallet 302 has the cryptocurrency (which is also referred to herein as "coins" to refer to units of cryptocurrency). Optionally primary contract 304 is primed or receives control over these coins. For example, if primary contract 304 is to trade Ether, then primary contract 304 has immediate access to the coins.

For ERC20 tokens on the other hand, preferably the user first sets an allowance for a specific ERC20 token to TokenTransferProxy 306, also referred to herein as TransferProxyContract 306 or simply as Proxy 306, the function of which is described in greater detail below. TokenTransferProxy 306 requests the transfer of the amount specified by the user from the token source, such as ERC20 308A/B, and hands them over to primary contract 304.

In this non-limiting example, proxy 306 then obtains an ERC-20 Token or some other type of token to be able to pay for the transaction. These are shown as 308A, 308B. This is done either from the user's wallet 302 or from a separate amount of cryptocurrency and/or fiat currency, which the user may have provided access to, so that TokenTransferProxy 306 is able to obtain funds to be able to purchase these tokens to be able to fund the trade. By funding the trade, optionally, TokenTransferProxy 306 only obtains or handles sufficient tokens (in this non-limiting example ERC20) to be able to pay for fees associated with the trade.

TokenTransferProxy 306 is optionally implemented according to the 0x platform and is preferably responsible for transferring ownership of ERC20 tokens, as a non-limiting example of a type of currency for receiving payment, from the user to primary contract 304 on execution of a sell order. The user is therefore required to set an allowance for the TokenTransferProxy 306 prior to selling any tokens through the system. The TokenTransferProxy 306 maintains a record of addresses which have been authorized to transfer tokens on its behalf, the only address with this authorization is primary contract 304. Optionally a safeguarding mechanism such as a multi-sig or time-locked contract is implemented to control address authorization.

Primary contract 304 also then evokes various contract handlers, optionally only after receiving the fee, shown as an EtherDeltaHandler 310, a 0x Handler 314, and KyberHandler 320. These various different handlers are operated by the platform as smart contracts in order to be able to access, respectively, EtherDelta Exchange 312, 0x Exchange 316, and Kyber Exchange 318. These are shown as non-limiting examples, only without any wish to be limited. Optionally, various other types of smart contracts, secondary smart contracts, could be invoked or executed by primary contract 304 in order to reach various types of exchanges in order to buy or sell the cryptocurrency, according to the user commands.

Such a modular architecture supports rapid and simple integration with new exchanges.

When the user submits a series of trades to primary contract 304, a transaction is sent which invokes the executeOrders function. After an initial sanity check on the payload data, any tokens that the user wishes to sell are transferred to the primary contract via the TokenTransferProxy 306, followed by a check to ensure enough ether or other tokens will be available to conduct all trades.

The payload is preferably split into separate trades for different types of actions, such as buy or sell, and for different types of cryptocurrencies (e.g. buy ZRX, sell OMG), each of which can be subsequently split into several DEX orders in order to gain the optimal price. The primary contract 304 loops through each token trade, sequentially executing all orders at their respective exchange handlers.

A count is kept of the amounts spent and acquired, and after each trade the primary contract 304 performs a check to ensure that all orders were executed equal to or above the minimum exchange rate. Subsequent to the execution of all trades, any ether gained through tokens sales is returned to the user, for example to the user wallet 302, and execution is completed.

Figure 4A:
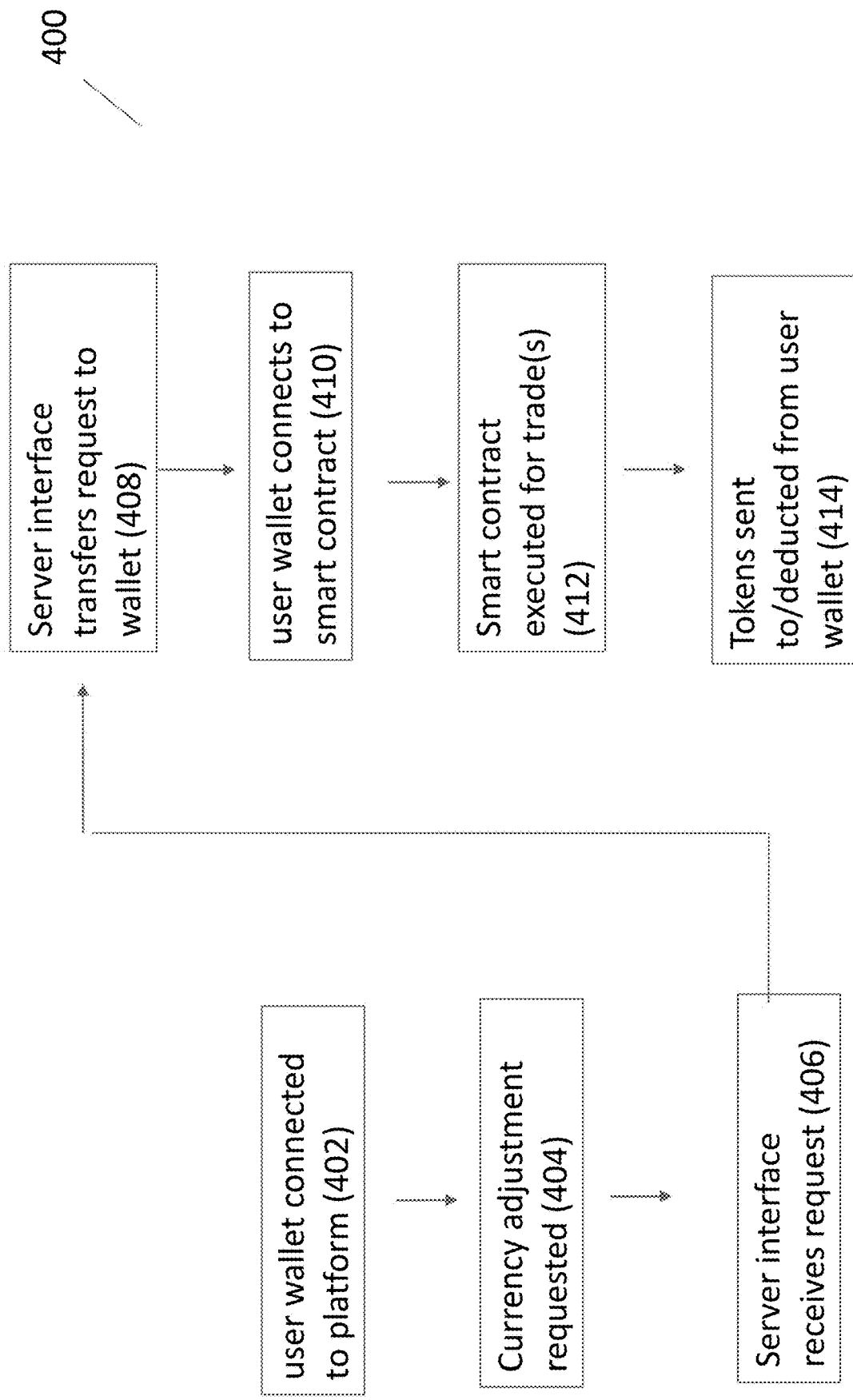
FIGS. 4A and 4B show non-limiting, exemplary methods for decentralized trading of cryptoassets according to least some embodiments of the present invention.

FIG. 4A shows a method of operation 400 for the previously described system and platform. Preferably, permission is to access the user wallet is not required for operation of this method, but could optionally be included. The user wallet may however connected to the platform in 402 to permit operation of a trade as described herein. A currency readjustment is requested in 404. This may involve buying or selling various types of cryptocurrency. The server interface receives a request in 406, and then transfer the request to the wallet in 408.

The user signs the transaction with the private key stored in the user wallet in 410. For a transaction involving Ether for example, it is transmitted to the Ethereum network. The miner picks up this transaction, invokes smart contract execution and its algorithm. This smart contract, for example, may be the primary contract, as previously described. Smart contract is executed for one or more trades, and preferably for all of the trades, in 412, and then tokens are sent to or deducted from the user wallet in 414. Optionally and alternatively, tokens are deducted from the user's wallet at the initiation of the trade execution, to enable purchase of coins and/or to fund the purchase (for example as previously described).

Figure 4B:
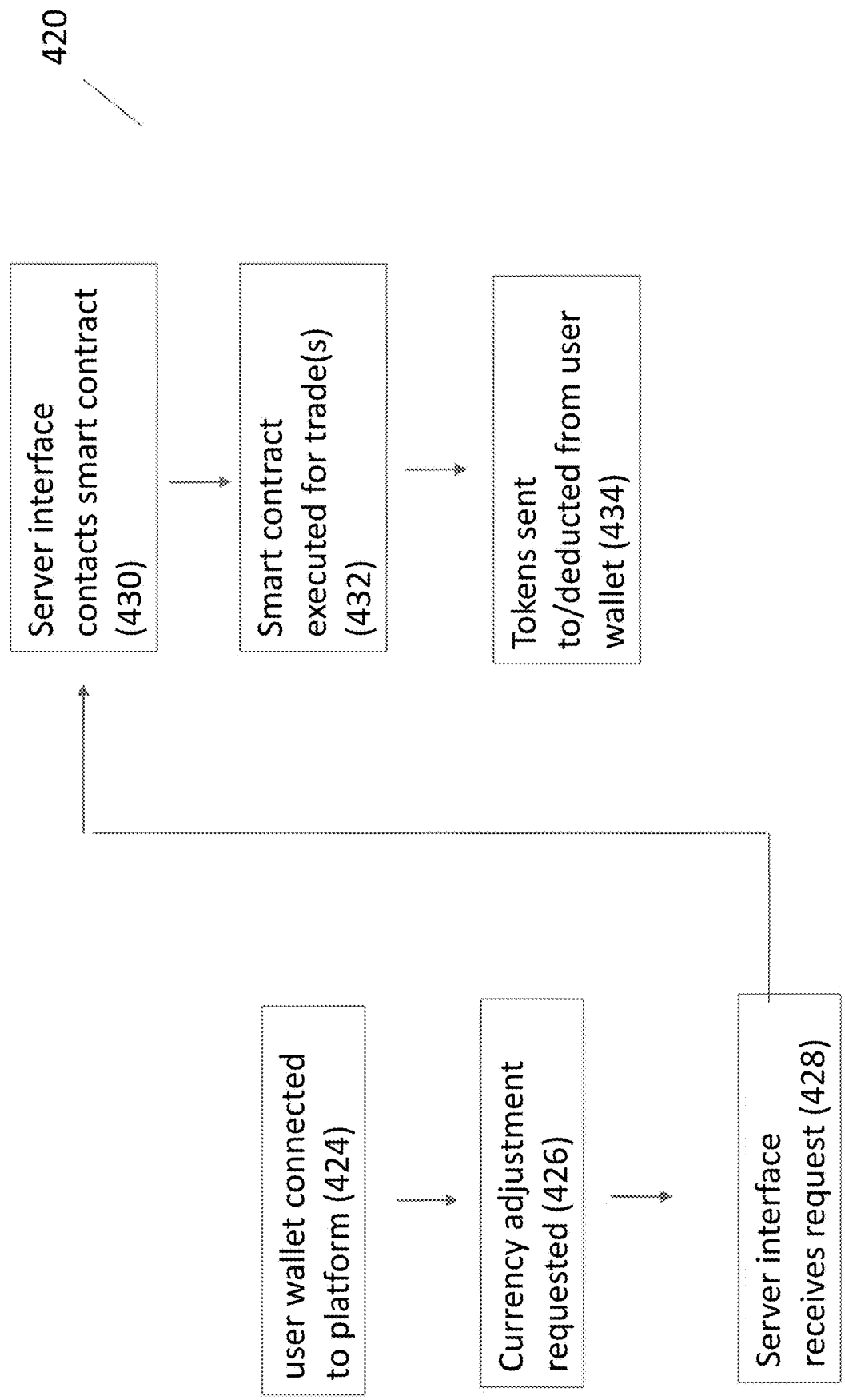

FIG. 4B shows an alternative method of operation in which steps 424, 426, and 428 are similar to steps 402, 404, 406, and 408, or even identical to them. However, in step 430, the server interface contacts the smart contract directly, rather than having the user wallet make the contact to the smart contract. The smart contract is then executed for one or more trades in 432, and tokens are sent to or deducted from the user wallet in 434. Again, optionally and alternatively, tokens are deducted from the user's wallet at the initiation of the trade execution, to enable purchase of coins and/or to fund the purchase (for example as previously described).

Figure 5:
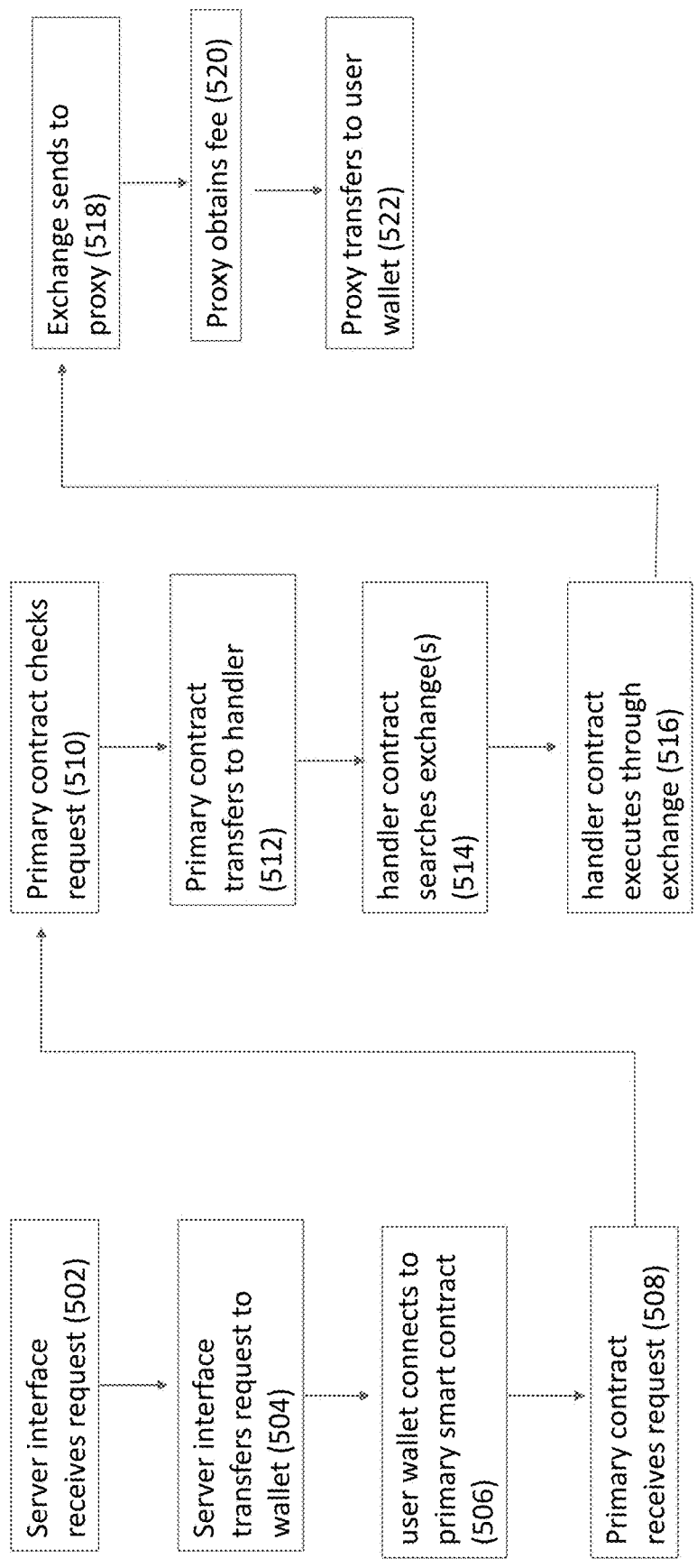
FIG. 5 shows a non-limiting exemplary method for operation of the system with primary and secondary smart contracts.

FIG. 5 shows a non-limiting exemplary method for operation of the system with primary and secondary smart contracts. Some steps which are described previously are not described here for clarity and ease of description, but without any wish to be limited. The method begins . . . . The method still has the previous steps in terms of receiving access to the user wallet and so forth, but for clarity, the description herein starts with 502, where the server interface receives a request for buying or selling cryptocurrencies. The server interface transfers the request to wallet 504. Optionally, if a web app or other application, for example on the user computational device, is enabled that is separate from the server interface, then such a web app or other application may receive the request from the server interface and then transfer the request to the wallet. The necessary transaction information is preferably included in the request, so that for example the user wallet is able to sign the transaction with regard to the primary smart contract. The user wallet is then preferably used to sign the transaction which contains the order information, contract address and optionally also ether, in regard to the primary smart contract, 506.

The primary contract receives the request 508, and then the primary contract checks the request 510, both for a sanity check and also to make certain that the user wallet actually has access to the cryptocurrency or other funds required to able to execute the trade. The primary contract transfers to the respective handler 512, such as, for example, the Ether handler, or Bitcoin handler, or another type of handler, for an exchange to be able to perform the trade.

The handler contract then executes the instructions received from the primary contract at one or more exchanges in 514, and then the handler contract executes the exchange in 516. If the fee for the transaction was not already obtained, then the proxy is informed of the transaction in 518, for example by the primary contract. If necessary, the proxy obtains the fee in 520, for example as previously described, by taking ERC20 tokens out of the user's stored balance of such tokens. Optionally, the proxy has placed a hold on or otherwise obtained funds from the user to be certain that this fee can actually be obtained, for example from the previously described balance. In 522, the proxy then transfers the coins to user wallet.

Figure 6:
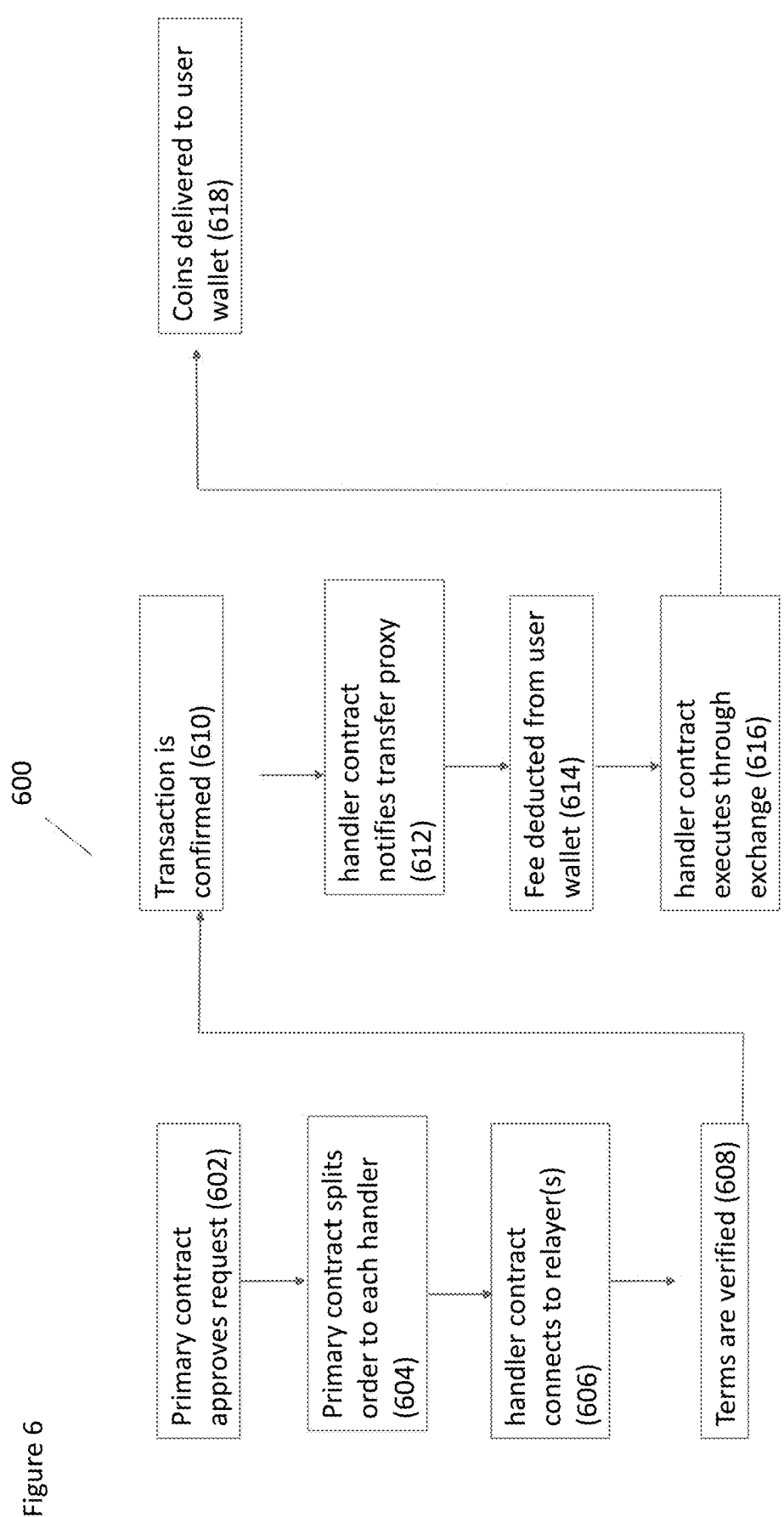
FIG. 6 shows a detailed exemplary trading operation with primary and secondary smart contracts, in this case including an optional relayer.

FIG. 6 shows a detailed trading operation with primary and secondary smart contracts, in this case including an optional relayer. In a process 600, the primary contract approves a request 602. Again, earlier steps are not shown for clarity and ease of description, but without any wish to be limited. The primary contract then splits the order to each handler 604, according to the type of currency required and according to the ability of each handler to contact an exchange to obtain that currency, or to sell that currency.

The handler contract connects to one or more relayers 606 to fulfill the terms of the transaction. The terms are confirmed at 608. The transaction is then confirmed at 610.

The relayer may optionally be implemented as a Øx Relayer which is an entity that facilitates hosting a Øx order book. The book is filled with any number of individually signed orders from different Ethereum addresses. When an order fills, it is settled directly on the Ethereum blockchain using the deployed Øx smart contracts.

Relayers collect fees, for example in the form of ZRX tokens, for hosting and facilitating the orders. For example, relayers support the ability of users to retain their own private keys, only enabling the smart contract to cause the transfer to be recorded on the blockchain.

The handler contract notifies the transfer proxy in 612 that the trade has been executed, and then the fee is deducted from the previously described balance of tokens that are to be used for such fees 614. The handler contract executes the trade through the exchange 616, and Ether coins are delivered to the user wallet 618, or, alternatively, are taken from the user wallet in 618. Optionally, again, such coins, if they are to be sold or had a hold placed on them in the blockchain, may be taken from the user wallet at the initiation of the transaction rather than at its close.

A non-limiting example of how the above flow may operate is provided below. First the user optionally navigates to a website by browser with a Metamask extension, or by wallet built into a DApp browser on a desktop or a mobile device, or otherwise invokes the platform, for example through a web app.

The platform establishes a connection to the wallet and fetches the information about the available address, active address, and so forth. Information about its assets is preferably obtained from the blockchain.

For this non-limiting example, the user digitally signs an Ethereum transaction sending ETH to a platform-controlled address or smart contract, depending on the custodial flow. The transaction is mined and confirmed by the appropriate number of blocks.

The user optionally adjusts the token allocation by decreasing/increasing the number of tokens that exist in the user's portfolio, or by adding new tokens.

The user-specified allocations may then be converted from percentages into fixed amounts of ETH to acquire the asset.

Next, the platform generates a request to the engine, sending the new token's allocation data. An Asset Purchase Order (APO) specifies the unique asset identifier, a max amount of ETH to spend, and a minimum amount of the asset to acquire. These latter two attributes provide a target price range based on up-to-date information from aggregated price information across exchanges and relayer order books.

Next the engine locates the orders that are to be filled to find available prices for the user's allocation request. The amount of ETH spent and asset acquired, i.e., the true price of the asset, will be determined by actual sell orders that exist in the market at that time, but the range is needed to minimize the platform's risk during times of low liquidity and to enable fast, cost-effective fulfillment of APOs. Optionally a floor may be placed as a minimum price for sell orders and a ceiling may be placed as a maximum price for buy orders.

The platform, for example through the web app or other user interface, receives the data and sends it to the wallet or displays it to the user for the user's confirmation.

The wallet then submits the transaction to the smart contract through the Ethereum network.

The smart contract receives the transaction together with the order data and sends all order requests to the respected decentralized exchanges. Optionally the platform fulfills APOs by acquiring at least the minimum units of the given asset using at most the max amount of ETH specified in the APO. The platform locates offers to sell the asset by searching through off-chain order books managed by its network of liquidity provider partners, looking for the best deals to match the APO requirements. The platform takes these deals by sending signed transactions to the Ethereum blockchain, although preferably this occurs before the transaction is submitted to the network. The APO is considered fulfilled once enough transactions have been confirmed such that the platform has an amount of the asset greater than or equal to the minimum specified in the APO.

Optionally additional logic like ETH to WETH conversion may be implemented if required by the exchange.

Next the smart contract receives the acquired tokens. The smart contract sends the acquired tokens to the user's wallet. Once an APO has been fulfilled (either by executing trades, having the asset "in-stock," or some combination of the two) the platform can transfer the assets to the user's wallet. This can be done directly, via an escrow smart contract, or not at all depending on the user's preferred custodial model.

Figure 7A:
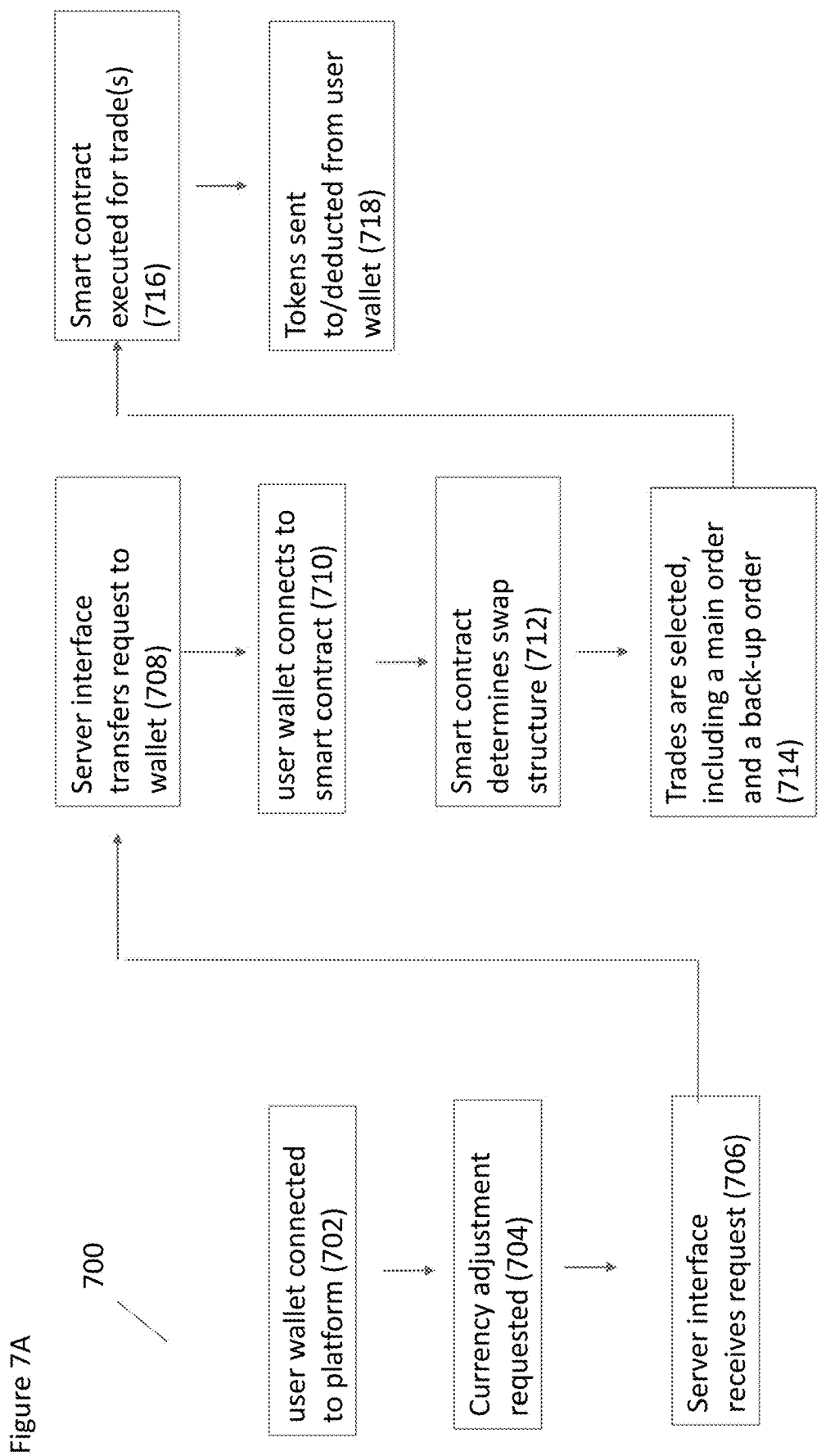
FIGS. 7A and 7B show methods of operation for the previously described system and platform, which are similar to FIGS. 4A and 4B, except that now the cryptoasset exchange is implemented as a swap rather than as a buy/sell order.
Figure 7B:
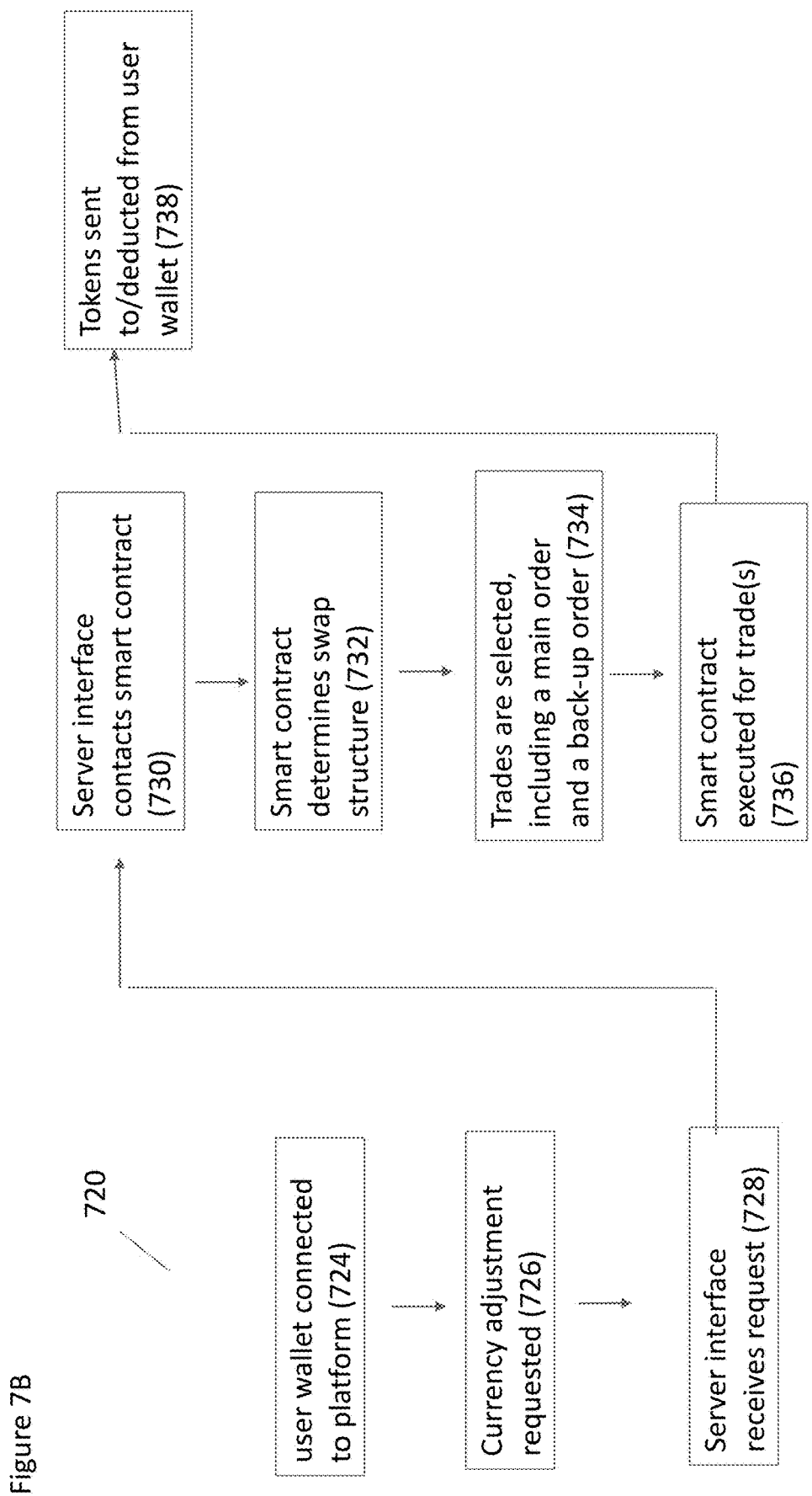

FIGS. 7A and 7B show methods of operation for the previously described system and platform, which are similar to FIGS. 4A and 4B, except that now the cryptoasset exchange is implemented as a swap rather than as a buy/sell order. Preferably the swap is conducted as a plurality of trades, including a main and optionally including at least one back-up order. Optionally no back-up order is included. Optionally a plurality of swaps are executed in a single transaction.

Preferably, permission is to access the user wallet is not required for operation of this method, but could optionally be included. In a method 700, the user wallet may however be connected to the platform in 702 to permit operation of a trade as described herein. A currency readjustment is requested in 704. This may involve buying or selling various types of cryptocurrency. The server interface receives a request in 706, and then transfer the request to the wallet in 708.

The user signs the transaction with the private key stored in the user wallet in 710. For a transaction involving Ether for example, it is transmitted to the Ethereum network. Optionally, transactions are transmitted to the Ethereum network, even if Ether is not being traded. The miner picks up this transaction, invokes smart contract execution and its algorithm. This smart contract, for example, may be the primary contract, as previously described. At step 712, the smart contract determines the structure of the swap needed to perform the currency adjustment. Alternatively, a decentralized third party module could be invoked to determine the swap structure (not shown).

Optionally the structure of the swap is determined according to one or more user preferences. For example, the main and backup orders may selected according to a particular logic, which is preferably determined according to user preferences. For example, a "safe" algorithm may be used to target orders with long expiration, enough liquidity, and other such parameters relating to safety. Alternatively, an aggressive algorithm may target low expiration orders with a low price. A DEX diversification algorithm may be used to include multiple different DEXs in the backup orders. The user may also request a Safe Fallback algorithm, in which the user indicates that one DEX is preferred, for example as being the safest or most successful, in which case only that DEX would be used for that user. Optionally these strategies may be mixed, for example by employing one strategy for the main order and one strategy for the backup orders. Users may configure this in run-time selection.

Next, a plurality of trades are selected, including at least one main order and at least one back-up order, in 714, for the swap to be performed. Alternatively this selection occurs between 706 and 708, as an off-chain selection action. Optionally the trade selection is performed by the smart contract but may also be performed by a decentralized third party module and/or by an off-chain back-end system (not shown).

The swaps are preferably performed through direct token trades, eliminating the need for an intermediate asset (such as for example an intermediate cryptocurrency). Without wishing to be limited by a closed list, this flexibility means more pairs, more liquidity, and better rates for users.

The smart contract is executed for all of the selected trades, in 716, and then tokens are sent to or deducted from the user wallet in 718. Optionally and alternatively, tokens are deducted from the user's wallet at the initiation of the trade execution, to enable purchase of coins and/or to fund the purchase (for example as previously described).

FIG. 7B shows an alternative method of operation (shown as 720) in which steps 724, 726, and 728 are similar to steps 702, 704, 706, and 708, or even identical to them. However, in step 730, the server interface contacts the smart contract directly, rather than having the user wallet make the contact to the smart contract. At step 732, the smart contract determines the structure of the swap needed to perform the currency adjustment. Alternatively, a decentralized third party module could be invoked to determine the swap structure (not shown). Next, a plurality of trades are selected, including at least one main order and at least one back-up order, in 734, for the swap to be performed. Alternatively this selection occurs between 728 and 730, as an off-chain selection action. Optionally the trade selection is performed by the smart contract but may also be performed by a decentralized third party module and/or by an off-chain back-end system (not shown).

The smart contract is then executed for one or more trades in 736, and tokens are sent to or deducted from the user wallet in 738. Again, optionally and alternatively, tokens are deducted from the user's wallet at the initiation of the trade execution, to enable purchase of coins and/or to fund the purchase (for example as previously described).

Figure 8:
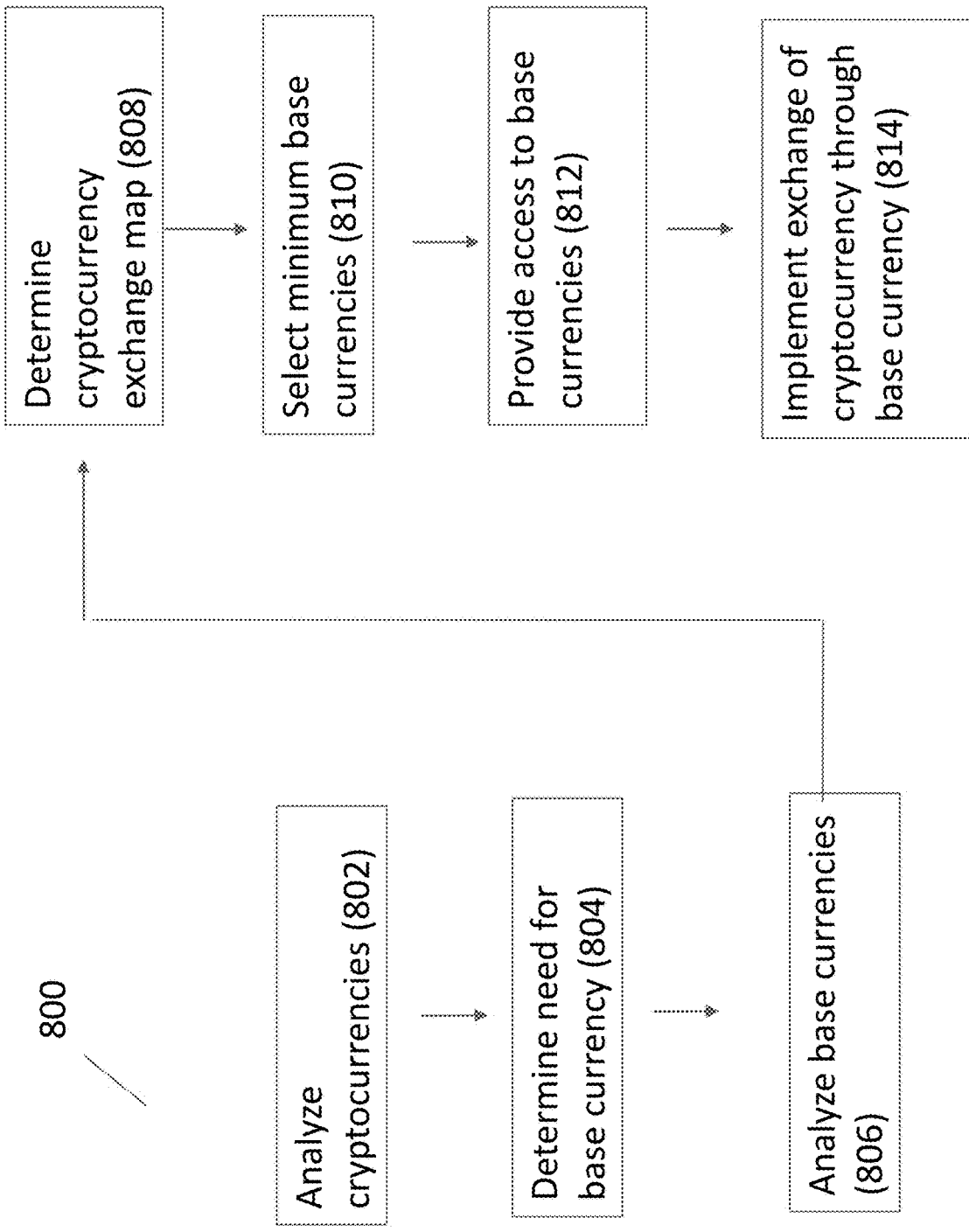
FIG. 8 shows a non-limiting exemplary method for analyzing a plurality of cryptoassets, such as cryptocurrencies in this example, and for determining combination of cryptocurrencies to trade for facilitating the above described cryptocurrency exchange or trade.

FIG. 8 shows a non-limiting exemplary method for analyzing a plurality of cryptoassets, such as cryptocurrencies in this example, and for determining combination of cryptocurrencies to trade for facilitating the above described cryptocurrency exchange or trade. Optionally such a method may be implemented with a relayer as described above. In a method 800, a plurality of cryptocurrencies are analyzed for interchangeability and exchangeability in 802. For various reasons, not all cryptocurrencies may be directly exchangeable—although they may be exchangeable through a base currency. For example, a lack of direct exchangeability may occur due to the lack of liquidity between two assets. This problem may be overcome by having an intermediate asset. For example, the trade of asset A for asset B can be split up into two trades of asset A to BASE asset (for example, the base currency), and then from the BASE asset to asset B. By having a number of different base assets, numerous potential trade routes may be constructed in order to maximize liquidity and lower the rate. After constructing the available routes and discovering prices for the corresponding trades, the best outcome (according to various criteria as described below) may be selected. At 804, it is determined which cryptocurrencies require a base currency for exchange.

For example, the base currency wETH is used to be able to trade ETH (Ethereum) for other ERC-20 tokens on decentralized platforms that run on Ethereum. Because decentralized platforms running on Ethereum use smart contracts to facilitate trades directly between users, every user needs to have the same standardized format for every token they trade. This ensures tokens don't get lost in translation.

Next a plurality of base currencies are analyzed in 806. In 808, the analysis is implemented to determine a map that permits the plurality of cryptocurrencies to be exchanged. In 810, preferably the minimal number of base currencies is selected that permits all of the cryptocurrencies to be exchanged, to reduce transactional costs and friction. In 812, access to these base currencies is implemented in any of the trading methods or systems described above, in order to permit exchange between any plurality of cryptocurrency assets. In 814, optionally an exchange between a plurality of cryptocurrency assets is performed, for example according to any method or system as described herein.

Preferably, the plurality of cryptocurrencies is a pair, as more than two cryptocurrency assets may be exchanged in swaps that are built from pairs of exchanged cryptocurrencies. If the cryptocurrencies cannot be exchanged directly, then one of the base currencies is used for the exchange, or even a plurality of base currencies if necessary, as determined by the previously described map.

Figure 9:
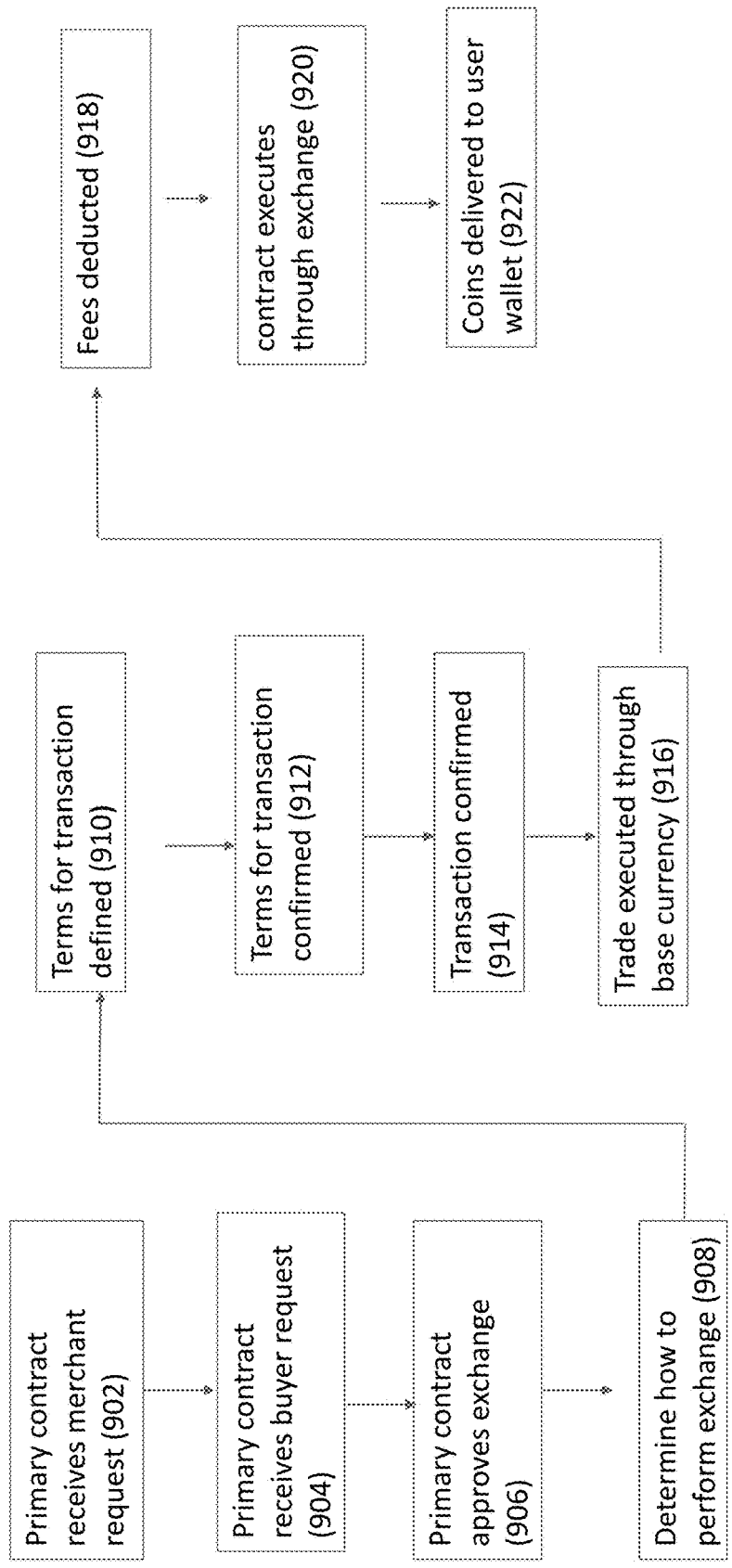
FIG. 9 shows a detailed exemplary merchant payment operation with primary smart contracts, which is very similar to FIG. 5 or 6, except now neither a relayer nor a proxy is required to support payments to merchants.

FIG. 9 shows a detailed exemplary merchant payment operation with primary smart contracts, which is very similar to FIG. 5 or 6, except now neither a relayer nor a proxy is required to support payments to merchants. Although neither a relayer nor a proxy is required to support such payments, optionally either a relayer or a proxy is implemented (not shown).

In a process 900, the primary contract approves a request 902 from a merchant to be paid. In 904, the primary contact also receives a request from a buyer to pay the merchant. Optionally both sides of the payment request are received by a single primary contract. Again, earlier steps are not shown for clarity and ease of description, but without any wish to be limited. Preferably the primary contract is required to approve the exchange at 906.

The primary contract then determines how to fulfill the exchange request in 908, according to the type of currency required and optionally according to the applicability of one or more base currencies as previously described.

The primary smart contract preferably defines terms for the exchange at 910. Optionally one of the terms is the need for the buyer (purchaser) to pay additional cryptocurrency to cover any potential overage in terms of the exchange, for example due to a shift in the exchange rate. Any unused cryptocurrency would be returned to the buyer. Both parties confirm the terms at 912. The transaction is then confirmed at 914.

Optionally the trade is executed through the base currency at 916, and then the fee is deducted from the previously described balance of tokens that are to be used for such fees 918. The primary contract or a handler contract executes the trade through the exchange 920, and Ether coins are delivered to the user (buyer) wallet 922, or, alternatively, are taken from the user wallet in 922.

For any of the above implementations featuring a primary contract, preferably each transaction is encrypted as a specific payload, by signing that transaction with a private key to form a secure payload. Preferably the primary contract checks the signature and discards any payloads that do not match that signature. Such an implementation may for example be used to shift current on-chain verifications off-chain, which is more efficient and which may also result in lower transaction fees.

The payload preferably has an expiration, and the Primary Contract preferably discards all expired payloads. This expiration is preferably defined in real time for each and every request by the off-chain back-end system, and it can be based on a different number of parameters: strategy based expiration, exchange based expiration, or any other desired logic. This process may also be used to gracefully fail a transaction if the payload is expired, which is more efficient and which may also save fees.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for facilitating trading of cryptoassets through a plurality of different exchanges, wherein each transaction of a cryptoasset is recorded on one of a plurality of blockchains, the system comprising:
 a user computational device, wherein said user computational device operates a user interface; and
 a server in communication through a computer network, wherein said server operates a server interface, wherein said server interface:
 accesses each of said plurality of blockchains,
 receives a command to execute a transaction and transmits said command to said server interface,
 returns transaction information to said user interface to execute said transaction, said transaction information including smart contract information, such that said user interface causes said transaction to be executed through a plurality of smart contracts, including a primary smart contract and a handler smart contract, wherein said primary smart contract is operative for a first blockchain and wherein said handler smart contract is operative for a second blockchain, wherein said first and second blockchains are different, and wherein said user interface causes said primary smart contract to execute said transaction and said primary smart contract causes execution of said handler smart contract to cause execution of said transaction on said second blockchain.

2. The system of claim 1, further comprising a user wallet for holding access information to said cryptoasset, wherein said server interface returns said transaction information to said user wallet for signing said transaction.

3. The system of claim 2, further comprising a wallet manager operated by a wallet manager computational device, for receiving a transaction request from said user wallet and for interacting with said server interface to complete said transaction request.

4. The system of claim 1, further comprising a user wallet for holding access information to said cryptoasset, wherein said plurality of smarts contracts returns said transaction information to said user wallet for signing said transaction.

5. The system of claim 1, further comprising a user wallet for holding access information to said cryptoasset, wherein said primary smart contract returns said transaction information to said user wallet for signing said transaction.

6. The system of claim 1, further comprising an off-chain backend system for communicating with said primary smart contract and with said user wallet, wherein said off-chain backend system determines a swap comprising a plurality of transactions, wherein said plurality of transactions are executed to execute said transaction requested through said user wallet, and wherein said off-chain backend system communicates said swap to said user wallet.

7. The system of claim 1, further comprising a proxy for obtaining a fee for executing said transaction, wherein said proxy accesses a store of currency according to one or more commands from said user interface to obtain said fee.

8. The system of claim 7, wherein said store of currency comprises a store of cryptocurrency tokens.

9. The system of claim 8, wherein said plurality of smarts contracts contacts said proxy to initiate said transaction and wherein said proxy provides a transaction for exchanging cryptocurrency tokens.

10. The system of claim 9, further comprising a user wallet for holding access information to said cryptoasset, wherein said primary smart contract returns said transaction information to said user wallet for signing said transaction and wherein said primary smart contract directs said transaction with said proxy.

11. The system of claim 1, wherein said cryptoasset comprises a cryptocurrency.

12. A method for facilitating trading of cryptoassets through a plurality of different exchanges, wherein each transaction of a cryptoasset is recorded on one of a plurality of blockchains, the method comprising:
  accessing, at a server interface, each of said plurality of blockchains;
  receiving, at the server interface, a command to execute a transaction from a user computational device, wherein said user computational device operates a user interface;
  returning, at the server interface, transaction information to said user interface to execute said transaction, said transaction information including smart contract information, such that said user interface causes said transaction to executed through a plurality of smart contracts, including a primary smart contract and a handler smart contract, wherein said primary smart contract is operative for a first blockchain of the plurality of blockchains, and wherein said handler smart contract is operative for a second blockchain of the plurality of blockchains, wherein said first blockchain and said second blockchain are different, and wherein said user interface causes said primary smart contract to execute said transaction and said primary smart contract causes execution of said handler smart contract to cause execution of said transaction on said second blockchain.

13. The method of claim 12, further comprising accessing a user wallet for holding access information to said cryptoasset, wherein said server interface returns said transaction information to said user wallet for signing said transaction.

14. The method of claim 13, further comprising accessing a wallet manager operated by a wallet manager computational device, for receiving a transaction request from said user wallet and for interacting with said server interface to complete said transaction request.

15. The method of claim 12, further comprising accessing a user wallet for holding access information to said cryptoasset, wherein said plurality of smart contracts return said transaction information to said user wallet for signing said transaction.

16. The method of claim 15, wherein said primary smart contract returns said transaction information to said user wallet for signing said transaction.

17. The method of claim 12, further comprising accessing an off-chain backend system for communicating with said primary smart contract and with said user wallet, wherein said off-chain backend system determines a swap comprising a plurality of transactions, wherein said plurality of transactions are executed to execute said transaction requested through said user wallet, and wherein said off-chain backend system communicates said swap to said user wallet.

18. The method of claim 12, further comprising using a proxy for obtaining a fee for executing said transaction, wherein said proxy accesses a store of currency according to one or more commands from said user interface to obtain said fee.

19. The method of claim 18, wherein said store of currency comprises a store of cryptocurrency tokens.

20. The method of claim 19, wherein said plurality of smart contracts contact said proxy to initiate said transaction and wherein said proxy provides a transaction for exchanging cryptocurrency tokens.

* * * * *